United States Patent

[11] 3,556,554

| [72] | Inventor | Cyril Joseph Saward<br>Kenilworth, England |
|---|---|---|
| [21] | Appl. No. | 723,381 |
| [22] | Filed | Apr. 23, 1968 |
| [45] | Patented | Jan. 19, 1971 |
| [73] | Assignee | The Dunlop Company Limited<br>Birmingham, England<br>a corporation of Great Britain |
| [32] | Priority | Apr. 26, 1967 |
| [33] | | Great Britain |
| [31] | | No. 19118/67 |

[54] VEHICLE SUSPENSION SYSTEMS
11 Claims, 4 Drawing Figs.

[52] U.S. Cl. .................................................... 280/124,
267/35, 63
[51] Int. Cl. ....................................................... B60g 9/00,
B60g 11/26, B60g 11/62
[50] Field of Search .......................................... 280/124,
124F; 267/20, 20A, 21, 11, 63

[56] References Cited
UNITED STATES PATENTS

| 2,827,282 | 3/1958 | Weiss ......................... | 280/124(F)X |
| 3,003,758 | 10/1961 | Francis ....................... | 280/124(F)X |
| 3,027,176 | 3/1962 | Frick et al. ................... | 280/124(F) |
| 1,666,259 | 4/1928 | Krenke ....................... | 267/20 |
| 1,848,783 | 3/1932 | Hortsmann .................. | 267/20 |
| 2,103,946 | 12/1937 | Herr ............................ | 267/63X |
| 2,218,634 | 10/1940 | Best ............................. | 280/124X |
| 2,275,153 | 3/1942 | Ledwinka .................... | 267/21 |
| 2,634,986 | 4/1953 | McDaniel ..................... | 280/124X |
| 1,542,179 | 6/1925 | Sanford ....................... | 267/20 |

*Primary Examiner*—A. Harry Levy
*Attorney*—Jeffers and Young

ABSTRACT: A vehicle suspension incorporating trailing links pivotally secured at both ends of an axle between the axle and the vehicle frame for longitudinal location of the axle and antiroll compression springs mounted between abutments on the links and the axle, of which the following is a specification.

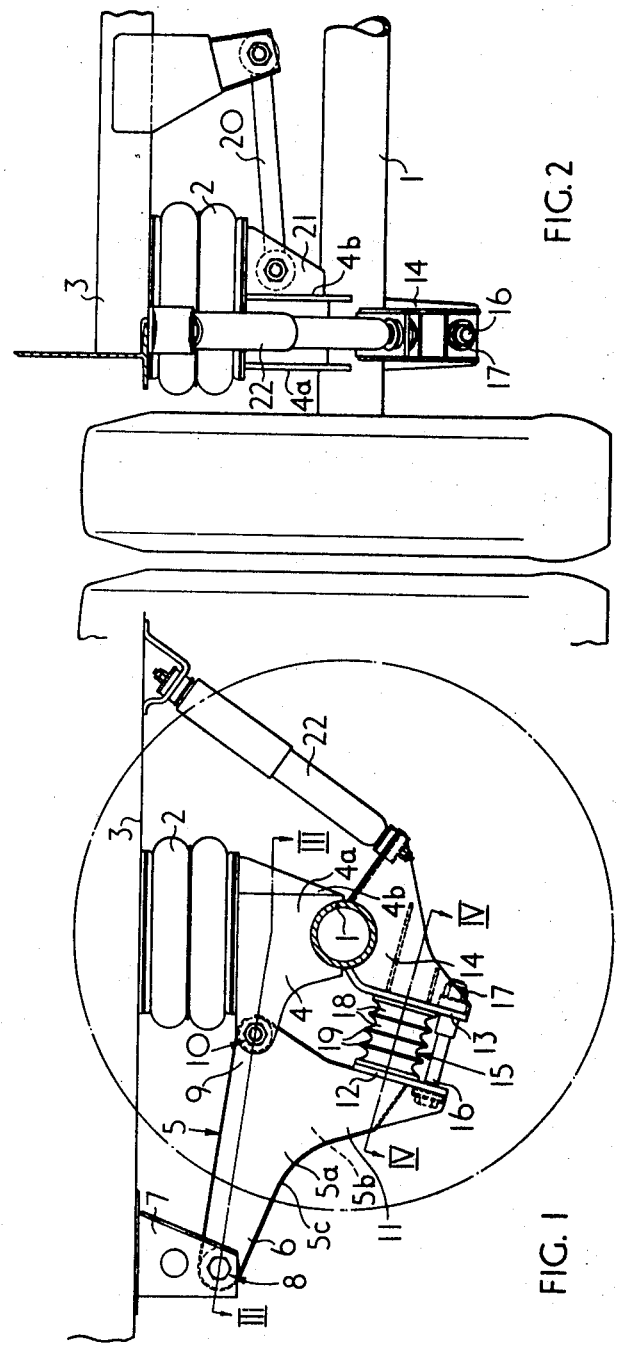

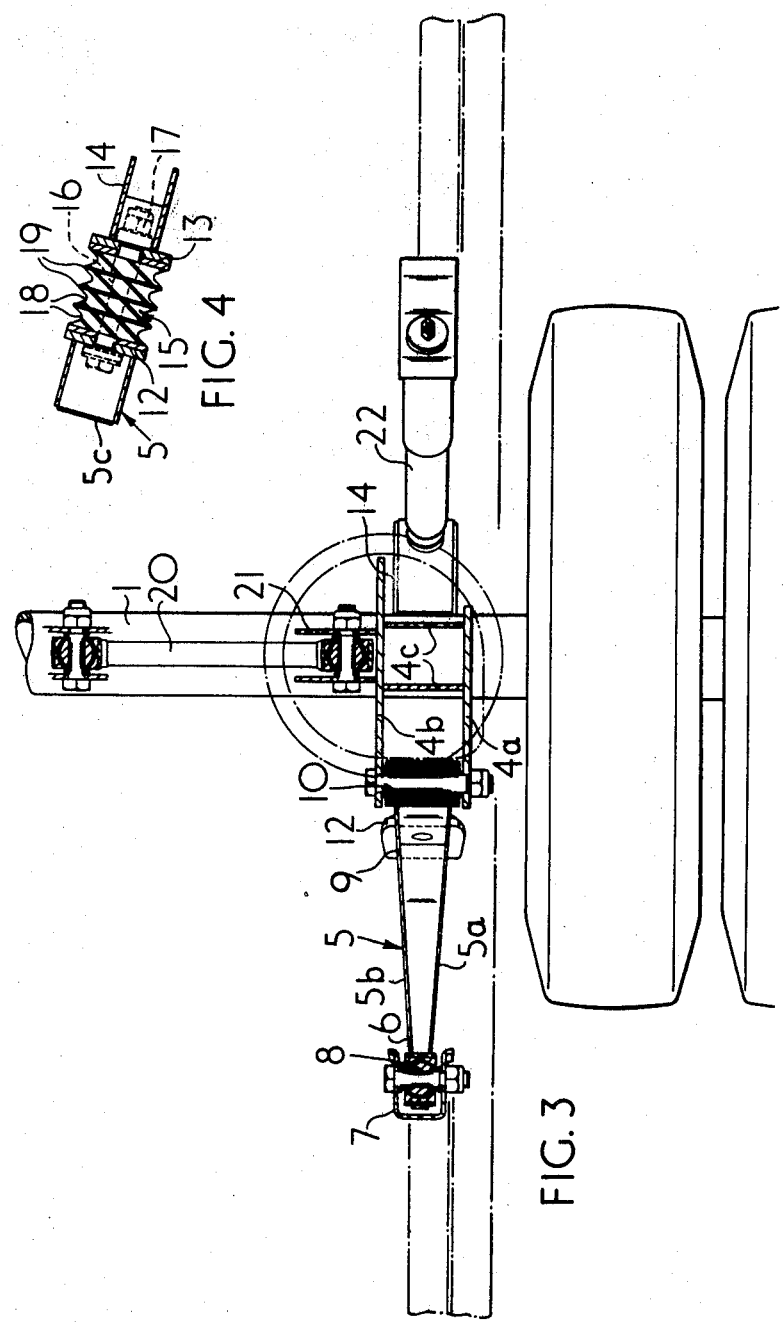

VEHICLE SUSPENSION SYSTEMS

This invention relates to vehicle suspension systems, and particularly, but not exclusively, to pneumatic spring systems.

A disadvantage of some vehicle suspension systems incorporating pneumatic suspension springs is that the springs may be mounted well within the lateral extremities of the vehicle frame and do not in these circumstances inherently provide good antiroll stiffness.

One object of the present invention is to provide means for locating a vehicle axle against longitudinal movement in relation to the vehicle and to provide antiroll characteristics to the system.

According to the invention a vehicle suspension device comprises a trailing link for longitudinal location of a vehicle axle relative to an associated vehicle, the link being arranged to be pivotally secured at one end to the vehicle axle, an antiroll spring mounted in association with abutments arranged to be associated respectively with the axle and the link to resist angular movement of the link about its point of attachment to the axle, and restraining means for preventing movement of the abutments away from each other beyond a predetermined distance while allowing unrestricted movement of the abutments towards each other.

According to the invention also a vehicle suspension device comprises a trailing link for longitudinal location of a vehicle axle relative to an associated vehicle, a suspension spring-supporting platform for attachment to the vehicle axle and pivotally secured to one end of the link, an antiroll spring mounted in associated with abutments arranged to be associated respectively with the axle and the link to resist angular movement of the link about its point of attachment to the supporting platform, and restraining means for preventing movement of the abutments away from each other beyond a predetermined distance while allowing unrestricted movement of the abutments towards each other.

Preferably, the antiroll spring takes the form of a spring of elastomeric material mounted in compression between confronting abutments formed respectively on a bracket and the antiroll link although other forms of springs may be used, for example a coiled steel spring.

One embodiment of the invention will now be described, by way of example with reference to the accompanying drawings in which:

FIG. 1 is an axial view of a vehicle axle assembly incorporating a vehicle suspension device according to the invention;

FIG. 2 is a longitudinal end view of part of the assembly shown in FIG. 1;

FIG. 3 is a plan view partly in section on the line III–III of FIG. 1;

FIG. 4 is a sectional view of a rubber spring one the line IV–IV of FIG. 1.

A pneumatic suspension system for an axle 1 of a ten ton trailer comprises a pair of pneumatic springs 2 to be mounted one on each side of the axle 1. The springs 2 are secured at their upper ends to the vehicle frame 3 and are mounted at their lower ends on spring-supporting platforms 4 secured to the axle 1. The suspension devices for the two sides of the axle are similar, and one only will therefore be described.

A trailing link 5 is secured, at its leading end 6 relative to the normal forward direction of movement of the trailer, to a lug 7 on the vehicle frame 3 by means of a universally movable rubber-bushed spherical joint 8. At its trailing end 9 the link 5 is pivotally secured by a second rubber-bushed joint 10 to a support 4 which also constitutes the supporting platform for the pneumatic suspension spring 2 and is welded to the upper surface of the axle 1. The second rubber-bushed joint 10 permits pivotal movement of the link 5 about an axis parallel to that of the axle 1. The link 5 is formed with a downwardly projecting portion 11 on which is formed a rearwardly facing abutment 12 below the second joint 10. A confronting abutment 13 is formed on a bracket 14 which is permanently secured by welding to the lower surface of the axle 1.

The link is formed from two similar 'L'-shaped parts 5a, 5b (see FIG. 1 and FIG. 3) held together by the abutment 12, the two rubber-bushed joints 8,10 and a third part 5c (FIG. 1) welded between adjacent edges of the two link parts 5a, 5b.

Similarly the supporting platform 4 is formed from two similarly shaped parts 4a, 4b held together by the welded joint to the axle and transverse struts 4c (FIG. 3).

An antiroll spring in the form of a rubber compression spring 15 is mounted between the confronting abutments 12, 13, which are limited in movement away from one another beyond a predetermined amount by means of a restraining bolt 16 passing longitudinally through a clearance hole formed in one abutment 12 and a tapped boss welded to the other abutment 13 and having a locked nut 17 secured at its end. The bolt 16 is positioned underneath the rubber spring 15 centrally with respect to the spring 15 (see FIG. 4). The rubber spring 15 is of the kind comprising rubber layers 18 interleaved with metal plates 19. Lateral location of the axle 1 is provided by a Panhard rod 20 (shown in FIGS. 2 and 3) attached between the vehicle frame 3 and a part 21 of the suspension platform 4. A conventional suspension damper 22 is also fitted between the frame 3 and the bracket 14.

In operation, when both sides of the axle 1 are simultaneously deflected in the vertical direction relative to the vehicle frame 3 the two supporting platforms 4 are able to tilt through the same angle to accommodate the angular movement of the downwardly projecting portions 11 of the trailing links 5, the trailing links 5 and the corresponding platforms 4 each effectively forming a solid structure which rotates about the spherical joint 8. When the vehicle rolls, for example on cornering, one side of the axle 1 will be displaced in the upward direction relative to the vehicle frame 3 whilst the other side will not be displaced by the same amount. The two supporting platforms 4 will therefore tend to tilt through different angles, and since this is prevented by the rigid axle 1 to which both platforms are attached the tilt is accommodated in a compression of the antiroll spring 15 on the side which is being deflected upwardly by the greater amount, thus providing a resistance to any tendency for the vehicle to roll on cornering. The antiroll spring 15 on the other side is simultaneously subjected to a tensile load which is resisted by the restraining bolt 16 passing through the abutments 12,13.

When the axle 1 is subjected to braking torque, the restraining bolts 16 are put in tension, and thus prevent rotation of the axle 1.

The restraining bolts 16 of the antiroll springs 15 may be used to provide means for adjusting the stiffness of the springs 15 within a limited range to suit different vehicles to which the device may be fitted, the stiffness of each spring 15 being increased by unlocking the nut 17, turning bolt 16 in a clockwise direction and relocking nut 17 when the desired stiffness has been attained.

While in the embodiment described above pneumatic suspension springs are provided, the invention is also applicable to suspension systems in which other forms of spring are employed, for example coiled springs.

The antiroll springs 15 described above are of the conventional sandwich type in which flat circular metal plates are interleaved with circular rubber blocks.

In alternative constructions other forms of spring such as coiled metal springs or chevron-type rubber/metal springs may be employed. Although the present invention has been illustrated and described in connection with a single example embodiment it will be understood that this is illustrative of the invention and is by no means restrictive thereof. It is reasonably to be expected that those skilled in this art could make numerous revisions and adaptations of the invention and that it is intended that such revisions and adaptations will be included within the scope of the following claims as the equivalents of the invention.

I claim:

1. A vehicle suspension device in combination with a vehicle frame, comprising a trailing bellcrank link having a pivotal connection at one end thereof to said vehicle frame and movable pivotally thereon in a vertical plane, a second pivotal connection at the other end of said trailing bellcrank link operatively connected to an axle of said vehicle, a first spring acting independently of said bellcrank link as a suspension spring between the axle and vehicle frame and adapted to resist vertical displacement of said bellcrank link relative to said vehicle frame, a second spring disposed vertically below the axle and adapted to serve as an antiroll spring, coacting abutments provided by said bellcrank link and axle respectively and arranged to receive said antiroll spring therebetween to resist relative angular movement between said link and axle, and nonyielding restraining means extending between said abutments for resisting movement of said abutments away from each other, said bellcrank link being formed with a downwardly projecting portion, relative to an associated vehicle, the abutment associated with the bellcrank link being formed on the downwardly projecting portion and defining a spacing relative to the abutment provided by said axle to receive said second spring therebetween.

2. A vehicle suspension device according to claim 1 wherein the abutment associated with the axle is formed on a bracket arranged to be attached to the axle and positioned below the axle relative to an associated vehicle.

3. A vehicle suspension device according to claim 1 wherein the restraining means comprises a bolt, passage means in said abutments through which said bolt passes, said bolt having a locked nut at its end to prevent movement of the abutments away from each other beyond a predetermined distance and said passage means including a clearance hole in at least one of the abutments to allow unrestricted movement of said at least one of said abutments towards the other.

4. A vehicle suspension device according to claim 1 wherein said restraining means comprises a bolt passing through a clearance hole formed in one abutment and secured in a tapped boss secured to the other abutment, the end passing through the tapped boss being provided with a locked nut, the bolt being positioned beneath the antiroll second spring centrally with respect to the spring.

5. A vehicle suspension device according to claim 1 wherein the antiroll second spring is a coiled steel spring.

6. A vehicle suspension device according to claim 1 wherein the link includes a universal joint arranged to be attached to an associated vehicle frame.

7. A vehicle suspension device according to claim 1 wherein the antiroll second spring is a spring of elastomeric material mounted in compression between the abutments.

8. A vehicle suspension device according to claim 7 wherein the spring of elastomeric material consists of layers of elastomeric material interleaved with metal plates.

9. A vehicle suspension device according to claim 7 wherein the elastomeric material is rubber.

10. A vehicle axle assembly comprising a pair of vehicle suspension devices as claimed in claim 1 wherein the suspension spring of each such device is comprised of a pneumatic spring.

11. A vehicle suspension device in combination with a vehicle frame, comprising a trailing bellcrank link having angularly related arms, one of said arms being a trailing arm and having a pivotal connection at one end thereof to said vehicle frame to provide swinging movement in a vertical plane, a supporting platform carried on a vehicle axle and having a pivotal connection with the other end of said trailing arm; a suspension spring acting independently of said bellcrank link and operatively disposed between said platform and vehicle frame to provide vehicle suspension support and arranged to control vertical displacement of said trailing arm relative to the vehicle frame, an antiroll second spring, coacting abutment means provided by the other of said bellcrank arms and said axle respectively and receiving said antiroll spring therebetween to resist relative angular movement between said other arm and supporting platform, and nonyielding restraining means extending between said abutments for limiting movement of said coacting abutment means away from one another.